Feb. 4, 1958  S. B. COHN  2,822,517
STANDING WAVE DETECTOR
Filed March 18, 1954
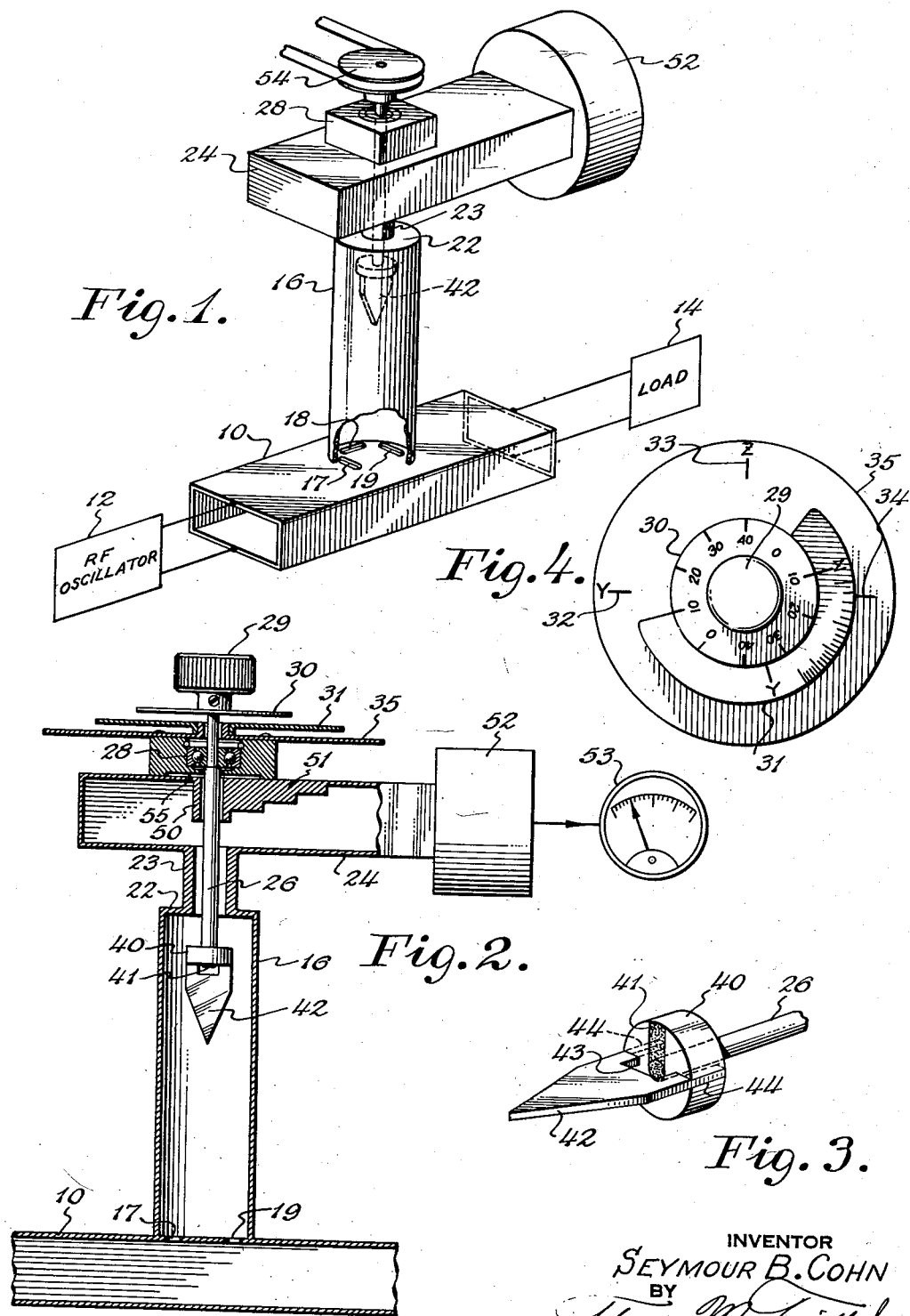
INVENTOR
SEYMOUR B. COHN
BY
Thomas M. Ferrill, Jr.
ATTORNEY

United States Patent Office 2,822,517
Patented Feb. 4, 1958

2,822,517

STANDING WAVE DETECTOR

Seymour B. Cohn, Palo Alto, Calif., assignor to The Sperry Rand Corporation, a corporation of Delaware Application March 18, 1954, Serial No. 417,074

20 Claims. (Cl. 324—58)

This invention relates to a standing wave detector, and more particularly to a novel probe for use in such detector and to a novel means for and method of using the probe.

My Patent No. 2,723,377, filed June 28, 1951, for a Standing Wave Detector, issued November 8, 1955, and assigned to the assignee of this application, explains that it is frequently desirable to measure standing waves existing along a transmission line and discloses an advantageous standing wave detector for the purpose. Said application shows, as one modification, a standing wave detector having a rotatable probe which can be advantageously used in the system. This rotatable probe terminates the component of the electric field parallel to itself but does not affect the component perpendicular thereto. This perpendicular component is reflected by the end of the circular wave guide and travels back down the circular guide to the coupling plate where it will again be reflected and travel back to the probe. If this reflected field component did not rotate, but returned to the probe still perpendicular thereto, it would cause no error in the reading of the meter. However, any imperfection of the circular guide can cause the field to rotate, and the coupling plate, being an apertured rather than a continuous sheet, will give rise to cross components relative to any field impinging on it. These spurious electric fields, due to reflections and excitation and having a component parallel to the probe, return to the probe where their component parallel to the probe is, in addition to the original unreflected component parallel to the probe, absorbed resulting in an erroneous reading of the meter.

To reduce the mass which must rotate with the probe and to simplify the output it is desirable to support the probe by a shaft extending along the axis of the circular wave guide.

It is therefore an object of this invention to provide a rotatable probe for giving an accurate indication of the magnitude of a selected electric vector in a circularly or elliptically polarized wave.

It is an object of this invention to provide a radial probe with means to prevent spurious reflections from affecting the energy picked up by the probe.

It is an object of this invention to provide a probe which will cause a minimum of reflections.

It is an object of this invention to provide a radial probe with means to absorb the electric field vector at right angles to the probe.

It is an object of this invention to provide a rotatable probe supported axially and arranged to have mounted thereon field absorbing means.

It is an object of this invention to provide an advantageous means for, and method of, measuring standing wave ratio and phase.

Other objects of this invention will become apparent to those skilled in the art from the following specification taken in connection with the accompanying drawings, in which, Fig. 1 is a perspective view, partially schematic, of a system including a standing wave detector which employs the principles of this invention;

Fig. 2 is a side elevational view in section of a standing wave detector embodying the principles of this invention, said section being taken along a plane including the longitudinal axes of wave guides 24 and 10;

Fig. 3 is a perspective view of the probe used in this invention; and

Fig. 4 is a top plan view of the dials shown in Fig. 2.

In Fig. 1, a wave guide 10 of rectangular cross-section serves as part of the transmission line between the source 12 of ultra high radio frequency energy and load 14. The rectangular wave guide 10 serves to convey energy of the $TE_{1,0}$ mode.

A wave guide 16 of circular cross-section is joined at right angles to a broad wall of the rectangular wave guide 10 and the two wave guides are intercoupled by means of suitable apertures in the wall of the rectangular wave guide, so that a small portion of the energy of the $TE_{1,0}$ mode in the rectangular wave guide 10 is coupled to the circular wave guide 16, and so that the energy in the circular wave guide 16 is of the circularly polarized $TE_{1,1}$ mode.

Various coupling arrangements may be employed to couple the rectangular wave guide 10 to the circular wave guide 16 so that the $TE_{1,0}$ mode of energy in the rectangular wave guide 10 is converted to the $TE_{1,1}$ circularly polarized mode in the circular wave guide 16, as is explained in my aforementioned Patent No. 2,723,377. However, to transfer the energy from the wave guide 10 to the wave guide 16 and convert it into circularly polarized energy over a wide range of frequencies, it is preferred to use as the coupling means three elongated apertures 17, 18 and 19, shown in Fig. 1, in the broad face of the wave guide 10.

Two of these elongated apertures 17 and 19 have their longitudinal axes at right angles to the longitudinal axis of the wave guide 10. They are centered on the broad face of the wave guide 10 and are located adjacent the periphery of the wave guide 16. The elongated slot 18 has its longitudinal axis parallel to the longitudinal axis of the wave guide 16. It is near the periphery of the wave guide 16, and is centered on the diametric line of the wave guide 16 which is at right angles to the diametric line on which elongated slots 17 and 19 are centered. The details of this three-slot coupling arrangement are explained in detail in my aforementioned Patent No. 2,723,377.

When the coupling arrangement described above is employed between the rectangular wave guide 10 and the circular wave guide 16, waves travelling in one direction in rectangular wave guide 10 give rise to circularly polarized waves having one direction of rotation in the circular wave guide 16, and waves travelling in the opposite direction in the rectangular wave guide 10 give rise to circularly polarized waves having the opposite direction of rotation in the circular wave guide 16. Exactly one wavelength occurs around the circumference at all frequencies. Accordingly, when standing waves exist along the rectangular wave guide 10, one standing wave is produced around the periphery of th circular wave guide 16, and the voltage standing wave ratio (VSWR) around the periphery of the circular wave guide 16 is equal to the VSWR along the rectangular wave guide 10.

The end of circular wave guide 16 remote from the end coupled to the wave guide 10 is closed by a conducting closure 22 having a central aperture to which is peripherally joined a tubular member 23 forming the outer conductor of a coaxial line. The other end of the tubular member 23 is peripherally joined to an aperture in output wave guide 24.

A shaft 26 extends axially along the axis of circular wave guide 16, through the tubular member 23 and through the output wave guide 24 emerging through an aperture aligned with the aperture to which tubular member 23 is attached. Shaft 26 is rotatably supported by bearing 28 which is in turn supported on the broad face of the wave guide 24 opposite the side attached to tubular member 23.

The end of the shaft 26 remote from the end extending into the circular wave guide 16 has fixed thereto a knob 29 by which the shaft 26 may be rotated. Fixed to rotate with the shaft 26 is a dial 30, best seen in Fig. 4. Mounted concentrically on the shaft 26 is a dial 31 which is rotationally movable independently of the shaft 26. Marks 32, 33 and 34 are maintained in a fixed position and in juxtaposition with dials 30 and 31. As shown in Figs. 2 and 4, they may be mounted on a circular plate 35 which is mounted concentrically with the shaft 26 and in a fixed position with respect to the wave guides 16 and 10.

On the end of shaft 26 which extends into circular wave guide 16 there is fixed a disc 40 of a material having a low dielectric constant. Shaft 26 extends through a central axial hole in the disc 40. Disc 40 and shaft 26 are fixed rotationally as by cement. The end of shaft 26 is approximately flush with the side of the disc 40 opposite to the side from which the shaft 26 protrudes.

A thin strip of conducting material 41 is fixed radially on the surface of the disc 40 with which the end of shaft 26 is flush and is electrically connected to the shaft 26. The strip 41 may advantageously be a thin coating of conductive silver paint.

Mounted substantially in a plane including the shaft 26 and at right angles to the faces of the disc 40 and to the radial strip is a resistance card 42. This resistance card 42 is fixed to the disc 40 by extending members 44 which fit into corresponding grooves in the periphery of the disc 40 and may be cemented thereto. The card 42 is of lossy material, or is a dielectric material coated with a lossy material, which will absorb the vector of the electric field peripendicular to the radial probe 41. The card 42 is electrically separated from the conducting strip 41 by the cutout portion 43.

A probe that has been found satisfactory in practice at about 9500 mc. employed a polystyrene disc, corresponding to the disc 40, which was approximately 9/10 inch in diameter and 1/8 inch in thickness. It employed a resistance card, corresponding to the card 42, having a widest dimension approximately equal to the diameter of the disc. The card, which had an over-all length of one inch, exclusive of extensions 44, tapered to a point through 2/3 inch on its end remote from the disc. The cutout portion, corresponding to the cutout portion 43, had a dimension of about 1/8 inch in a direction axially of the disc and a dimension of about 1/4 inch along the diameter of the disc. The resistance card was a plastic sheet coated with a material having a resistance of 100 ohms per square inch, known to the trade as U. S. Rubber Co. 63–087–17. The radial member of the probe, corresponding to the strip 41, was a thin coating of conductive silver paint, known to the trade as Du Pont No. 4929.

It will be understood that many kinds of resistance cards will be satisfactory in use. For instance, two resistance cards could be used, one on each side of the strip 41. Resistance cards could be used on both sides of the disc 40. The resistance card here disclosed has been found advantageous, however, because of its good electrical properties combined with good mechanical properties.

Preferably, a stepped or tapered transformer member 51 is provided in output wave guide 24 and adjacent said aperture to match the coaxial line consisting of tubular member 23 and shaft 26 to the wave guide 24. The transformer member 51 is wider than the shaft 26 which passes through an aperture in member 51. The aperture is of slightly greater diameter than shaft 26 to form a quarter-wave choke section 59 which co-operates with radial quarter-wave choke section 55.

Electrically connected to the end of the wave guide 24 is a detector 52 which may be of the crystal type. Detector 52 is connected to a meter 53 which gives an indication of the energy delivered to the detector 52.

The modification shown in Fig. 1 does not show the knob 29 and the dials 30, 31, 35 for hand operation, as is shown in Fig. 2, but shows a pulley 54 fixed to the end of the shaft remote from the circular wave guide 16. The pulley 54 could be connected by a belt with a motor which would rapidly spin the probe 42 for use in some systems that automatically produce impedance charts.

In the operation of the device described above and shown in Fig. 2, the mode $TE_{1,0}$ waves passing through the wave guide 10, are coupled into the circular wave guide 16 through the holes 17, 18 and 19 and at the same time, are converted into circularly polarized waves of the $TE_{1,1}$ mode. As has been explained above, if there are standing waves in the wave guide 10, there will be standing waves around the periphery of the circular wave guide 16, and the VSWR around the periphery of the circular wave guide 16 is equal to the VSWR along the rectangular wave guide 10.

The conductive strip 41 will pick up energy commensurate with the vector of the electric field along which the strip 41 radially extends. This energy will be conducted along the shaft 26 through the coaxial line consisting of the tubular member 23 and the shaft 26 and into the wave guide 24 through which it will be conducted to the detector 52. The detector 52 will supply unipotential energy to the meter 53 giving an indication of the magnitude of the electric field along said vector.

If the radial strip 41 is not oriented in a direction parallel to the electric field, there will be a component of the electric field perpendicular to the strip 41 which will not be picked up by the strip 41. Without the card 42 this component would be reflected. These reflections might be rotated as explained above and upon their return to the strip 41 would give rise to erroneous readings in the meter. However, the absorbing card 42 absorbs the component of the electric field at right angles to the strip 41 and prevents this error from arising.

A rotation of the radial strip 41 by the knob 29 in Fig. 2 will cause two maxima and two minima points to be indicated on the meter 53 for each complete rotation. The ratio of the maxima to the minima is the VSWR.

The dial 30 is directly calibrated in hundredths of a rotation, which corresponds to hundredths of a wavelength along the wave guide 10. Since impedances repeat every half wavelength, the scale on dial 30 is graduated from 0 to 50 hundredths twice per turn. If the VSWR and the dial reading at Z, the fixed mark 33, for minimum signal setting is plotted on a chart, the plot will indicate the correct impedance at a transverse reference plane in the rectangular wave guide passing through the axis of the circular wave guide. If the dial reading is taken at position Y, the fixed mark 32, the plot will show the admittance at the same reference plane. The phase relation of this point may be related to the phase relation at the load 14 by calculating the number of wavelengths between said transverse reference plane and the point of connection of the load 14.

To extend such readings through a range of frequencies, the frequency of the oscillator 12 would be shifted by a predetermined amount and again the strip 41 would be rotated by the knob 29 to obtain the ratio of the maximum and minimum and therefore the VSWR. Again the angular position of a maximum or minimum would indicate the phase relation at said transverse reference plane which could again be related to the phase at the point of load connection by calculation of the number of wavelengths between said plane and said load.

The dials 30 and 31 seen in Fig. 4 facilitate such readings taken through a range of frequencies. The auxiliary semi-fixed scale 31 may be used to give the correct value at a reference plane of the rectangular wave guide 10 other than the plane passing through the axis of the circular wave guide 16. The relationship between said transverse plane and the point of load connection could be calculated in advance for each of the frequencies to be used. The semi-fixed dial 31 would then be shifted with respect to the stationary mark 34 for each frequency used, either in accordance with previous calculation or in accordance with the calibration previously set into the dial 31. The phase reading would be taken from the marks on the dial 30 as they appear opposite the Z or Y marks on the dial 31. Once the dial 31 is set it remains stationary with respect to the stationary mark 34, irrespective of rotation of the dial 30, until the dial 31 is again set to a new position.

It will be seen that this invention provides a standing wave detector having a rotatable probe with a simplified output, the probe being arranged to give accurate indications of the electric field parallel to the radial position of the conducting probe. The construction of the probe is comparatively rugged mechanically and satisfactory electrically. It is well balanced dynamically for high speed rotation. Furthermore, this construction of the rotating probe permits use of a dial system whereby impedance measurement can be made with accuracy and ease through a range of frequencies.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A rotatable probe for sampling electrical energy of a circularly polarized electromagnetic wave comprising a thin conducting strip, means connected to said strip for selectively and adjustably orienting said strip about an axis passing through one end of said strip and being perpendicular thereto, sheet-like lossy means supported in fixed relation to said strip and rotatable with said strip, said lossy means being substantially planar and its plane including said axis and being at right angles to said strip.

2. A rotatable probe for sampling electrical energy of a circularly polarized wave comprising a disc of dielectric material, means for selectively and adjustably orienting said disc angularly about the axis of said disc, a thin conducting strip fixed to said disc along a radius thereof, and means for absorbing the electric field at right angles to said strip.

3. The combination of claim 2 in which the conducting strip is a thin coating of conductive paint.

4. The combination of claim 2 in which the absorbing means is a thin sheet of resistive material carried by said disc at right angles to the radial probe.

5. The combination of claim 2 in which the absorbing means is a thin sheet of dielectric material carrying a thin coating of lossy material.

6. The combination of claim 5 in which the sheet of lossy material has for a portion of its length adjacent said disc a transverse dimension diametrically of said disc substantially equal to the diametric dimension of said disc, the end of said sheet remote from said disc tapering to a point.

7. A rotatable electric probe comprising a disc of a material having a low dielectric constant at high frequencies, an electrically conducting shaft passing through said disc along the axis thereof and fixed thereto, a radial strip of electrically conducting coating on one side of said disc connecting with said shaft and extending to the periphery of said disc, a thin sheet of lossy material fixed to said disc and supported thereby, said sheet being in a plane including the axis of said disc and at right angles to said radial strip but electrically insulated therefrom.

8. The combination of claim 7 in which the sheet of lossy material has a width along its edge contiguous to the disc which is approximately equal to the diameter of the disc, in which this width is maintained along the length of said lossy sheet for a distance equal approximately to the radial dimension of the disc and then tapers to a point, the taper having a length approximately equal to the diameter of the disc.

9. The combination of claim 7 in which the sheet of lossy material is a coating on a thin sheet of supporting material.

10. The combination of claim 9 in which the sheet of supporting material is supported by extending members on said sheet, which extend into corresponding recesses in said disc, said sheet of supporting material being also cemented to said disc.

11. A first wave guide adapted to transmit electromagnetic energy in the $TE_{1,0}$ mode, a circular wave guide one end of which is coupled to said first wave guide by a coupling means arranged to convert energy in the $TE_{1,0}$ mode into circularly polarized energy in the $TE_{1,1}$ mode, the other end of said circular wave guide terminating in a coaxial line including a rotatable shaft as an inner conductor, said coaxial line extending along the axis of said circular wave guide and being electrically connected to an output means extending substantially perpendicularly to the axis of said circular wave guide, one end of said shaft extending into said circular wave guide and terminating in a radial conducting member, and lossy planar means mounted adjacent said radial member and mounted for rotation with said shaft so that the plane of said lossy material includes the axis of said shaft and is perpendicular to said radial member, the other end of said shaft extending externally of said coaxial means and said output means and terminating in rotating means.

12. The combination of claim 11 in which the lossy planar means is supported on the end of the shaft adjacent the radial member.

13. The combination of claim 11 in which a disc of dielectric material is mounted on said one end of said shaft and concentrically therewith, said radial conducting member being a strip of paint on said disc, said lossy planar means being mounted on said disc and consisting of a plastic sheet having a coating of lossy material.

14. The combination of claim 11 in which detector means is electrically connected with said output means 15. The combination of claim 11 in which said rotating means is a knob and in which there is a first calibrating dial mounted on said shaft, said knob and said first dial being fixed to said shaft for rotation therewith, a second calibrated dial mounted for selective rotation on the same axis as said first dial and adjacent thereto but rotatable independently thereof, and at least one mark associated with said two dials but fixed in relation to said circular wave guide.

16. The combination of claim 11 in which the output means is an output wave guide through which said shaft extends perpendicularly to the longitudinal axis thereof.

17. The combination of claim 16 in which choke means are provided at the point where said shaft emerges from said output wave guide.

18. The combination of claim 16 in which transformer means is provided in said output wave guide to match the coaxial line to said output wave guide.

19. In combination, a first wave guide for transmitting energy in the $TE_{1,0}$ mode, a second wave guide of circular cross section extending transversely from one wall of said first wave guide, means in said one wall for transferring a portion of the energy in said first wave guide to $TE_{1,1}$ mode energy propagated therefrom in said second wave guide, closure means at the opposite end of said second wave guide, a rotatable conductive rod extending through said closure means and axially into the interior of said second wave guide, a conductive probe arm extending transversely from said rod for receiving a selected transverse electric field component of the energy propagated through said second wave guide from said one wall of said first wave guide, and means supported by said rod for substantially absorbing the components of said propagated wave having other electric field directions than said selected component, said last-named means comprising an energy dissipator element extending transversely to said probe arm, whereby reflection of energy components back to said one wall for successive repropagations along said second wave guide and attendant interference with the probe arm response are suppressed.

20. The apparatus combination as defined in claim 21, further including energy output means coupled to said rotatable conductive arm externally of said second wave guide, said energy portion transferring means comprising a plurality of separated apertures in said one wall in an asymmetrical configuration relative to the axis of said second wave guide, and said energy dissipator element comprising a substantially resistive plate extending axially from said rod toward said one wall, said plate being tapered to a point at the end thereof nearest to said one wall.

References Cited in the file of this patent

UNITED STATES PATENTS

| | | |
|---|---|---|
| 2,434,508 | Okress | Jan. 13, 1948 |
| 2,526,678 | Mallet | Oct. 24, 1950 |
| 2,580,678 | Hansen | Jan. 1, 1952 |
| 2,580,679 | Hansen | Jan. 1, 1952 |

FOREIGN PATENTS

| | | |
|---|---|---|
| 592,224 | Great Britain | Sept. 11, 1947 |
| 684,453 | Great Britain | Dec. 17, 1952 |

UNITED STATES PATENT OFFICE
CERTIFICATE OF CORRECTION

Patent No. 2,822,517                              February 4, 1958

Seymour B. Cohn

It is hereby certified that error appears in the printed specification of the above numbered patent requiring correction and that the said Letters Patent should read as corrected below.

Column 3, line 38, for "peripendicular" read — perpendicular —; column 7, line 10, for the claim reference numeral "21" read — 19 —.

Signed and sealed this 11th day of August 1959.

(SEAL)
Attest:

KARL H. AXLINE                                    ROBERT C. WATSON
Attesting Officer                                  Commissioner of Patents